United States Patent Office 3,239,526
Patented Mar. 8, 1966

3,239,526
3-PHENYL-4-AMINOCINNOLINES
Harman S. Lowrie, Glenview, Ill., assignor to G. D. Searle & Co., Chicago, Ill., a corporation of Delaware
No Drawing. Filed July 13, 1964, Ser. No. 382,404
5 Claims. (Cl. 260—250)

The present invention relates to a group of 4-(substituted amino)-3-phenylcinnolines. In particular, it relates to a group of compounds which can be represented by the following general formula

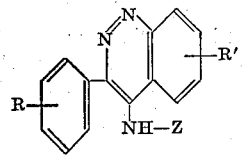

wherein R and R' are selected from the group consisting of hydrogen, methyl, methoxy, and halogen; Z is selected from the group consisting of hydroxy(lower alkyl), hydroxyethoxyethyl, and phenyl(lower alkyl). In those radicals mentioned above in which there is a lower alkyl group, the lower alkyl portion contains up to 6 carbon atoms. Thus, the hydroxy(lower alkyl) radicals can be exemplified by 2-hydroxyethyl, 3-hydroxypropyl, 4-hydroxybutyl, and the like. In a similar manner, the phenyl(lower alkyl) radicals referred to above can be exemplified by benzyl, 2-phenylethyl, 2-phenylpropyl, 3-phenylpropyl, and similar radicals. In these phenyl (lower alkyl) radicals, the phenyl group can be further substituted with groups such as halogen, methyl, and methoxy. The halogen radicals referred to above include fluorine, chlorine, bromine, and iodine.

The organic bases of this invention form non-toxic addition salts with a variety of organic and inorganic salts. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention can be conveniently prepared from the appropriate 4-chloro-cinnoline of the formula

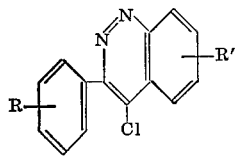

wherein R and R' are defined as above. This halide is reacted with the appropriate amine to give the compounds of the present invention. An excess of the amine can be used as the solvent or the reaction can be carried out in an inert solvent. One example of such a solvent is dimethyl sulfoxide. The reaction proceeds readily in dimethyl sulfoxide so that in this case it is unnecessary to use copper powder which is useful as a promoter in other solvents.

The compounds of the present invention are useful because of their pharmacological properties. In particular, they possess activity as anti-ulcer agents, pepsin inhibitors, and anti-algal agents. Their anti-algal activity is demonstrated by their inhibition of the growth of the organism *Chlorella vulgaris*.

The following examples are presented to further illustrate the invention; they should not be construed as limiting it in spirit or in scope. In these examples, quantities are indicated in parts by weight and temperatures in degrees centigrade (° C.).

Example 1

A mixture of 3 parts of 4-chloro-3-phenylcinnoline, 1 part of copper powder, and 20 parts of benzylamine is refluxed for 20 minutes. The resultant mixture is diluted with ether and then filtered. The filtrate is washed with dilute potassium hydroxide solution and then extracted with dilute hydrochloric acid. The acid extract is made alkaline with dilute potassium hydroxide and then extracted with ether. The ether solution is then dried, first with saturated sodium chloride solution and then with potassium carbonate, and the solvent is evaporated from the dry ether solution. The resultant residue is crystallized twice from ether and finally dried at 100° C. and 0.5 mm. pressure. The product thus obtained is 4-benzylamino-3-phenylcinnoline and it melts at about 141–142° C. This compound has the following formula

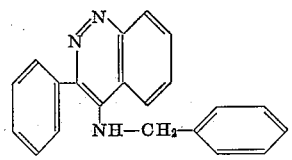

Example 2

An equivalent quantity of 4-chloro-3-(4-chlorophenyl) cinnoline is substituted for the 4-chloro-3-phenylcinnoline and the procedure described in Example 1 is repeated. The product thus obtained is 4-benzylamino-3-(4-chlorophenyl) cinnoline.

Likewise, if 4-chloro-3-(4-methoxyphenyl)cinnoline is reacted with benzylamine according to the procedure described in Example 1, the product obtained is 4-benzylamino-3-(4-methoxyphenyl)cinnoline.

Example 3

4 parts of 4-chloro-3-phenylcinnoline is reacted with 20 parts of 2-phenylethylamine according to the procedure described in Example 1. Isolation of the product is carried out as in Example 1 to give a crude product which is crystallized first from a mixture of ether and hexane and then from benzene to give 4-(2-phenylethylamino)-3-phenylcinnoline as white needles melting at about 145–146° C.

Example 4

The procedure described in Example 1 is repeated using 3.5 parts of 4-chloro-3-phenylcinnoline and 10 parts of d-amphetamine. After isolation of the product in the same manner as described in Example 1, the crude product is recrystallized from ether to give 4-(2-phenyl-1-methylethylamino)-3-phenylcinnoline as pale yellow needles melting at about 152.5–153.5° C., $[\alpha]_D^{26°} = -5°$ (chloroform). This compound has the following formula

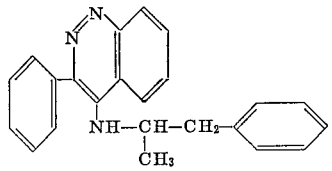

Example 5

A mixture of 4 parts of 4-chloro-3-phenylcinnoline, 1 part of copper powder and 20 parts of ethanolamine is refluxed for 20 minutes. The resultant mixture is cooled, diluted with water, and filtered. The filtrate is washed with dilute potassium hydroxide solution and then extracted with dilute hydrochloric acid. The acid extract is made alkaline with dilute potassium hydroxide solution and then extracted with methylene chloride. The resultant organic solution is then dried and the solvent is evaporated to leave a residue which is crystallized first from a mixture of methylene chloride and hexane and then from a mixture of methanol and benzene. The product thus obtained as shiny white plates is 4-(2-hydroxyethylamino)-3-phenylcinnoline melting at about 144–145° C. This compound has the following formula

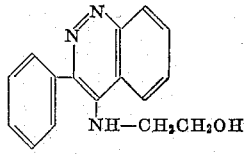

Example 6

If an equivalent quantity of 3-aminopropanol is substituted for the ethanolamine and the procedure described in Example 5 is repeated, there is obtained from the reaction 4-(3-hydroxypropylamino)-3-phenylcinnoline.

Example 7

A mixture of 4.8 parts of 4-chloro-3-phenylcinnoline and 4.2 parts of 2-(2-hydroxyethoxy)ethylamine in 10 parts of dimethyl sulfoxide is heated on a steam bath for 15 hours. The resultant mixture is cooled and diluted with methylene chloride and the methylene chloride solution is washed with dilute potassium hydroxide solution and then dried. The solvent is evaporated from this solution under reduced pressure and the resultant residue is stirred with ether to cause the yellow oil to crystallize. The solid thus obtained is filtered and recrystallized twice from benzene to give 4-[2-(2-hydroxyethoxy)ethylamino]-3-phenylcinnoline as pink plates melting at about 112–113° C. This compound has the following formula

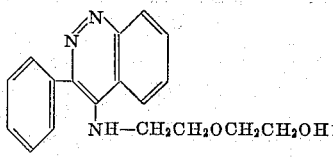

What is claimed is:
1. A compound of the formula

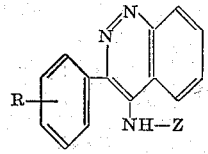

wherein R is selected from the group consisting of hydrogen, chlorine, and methoxy; and Z is selected from the group consisting of hydroxy(lower alkyl), hydroxyethoxyethyl, and phenyl(lower alkyl).

2. A compound of the formula

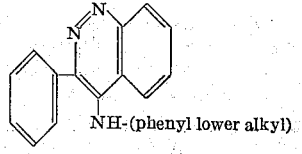

3. 4-benzylamino-3-phenylcinnoline.
4. 4-(2-phenylethylamino)-3-phenylcinnoline.
5. 4-(2-hydroxyethylamino)-3-phenylcinnoline.

No references cited.

IRVING MARCUS, *Primary Examiner.*